No. 824,694. PATENTED JUNE 26, 1906.
W. W. IRWIN.
METAL TRIMMING AND SLITTING MACHINE.
APPLICATION FILED FEB. 7, 1906.

2 SHEETS—SHEET 1.

Witnesses
H. H. Stough
Sylvia Boron

Inventor
William W. Irwin
By H. W. Bond
Attorney

No. 824,694. PATENTED JUNE 26, 1906.
W. W. IRWIN.
METAL TRIMMING AND SLITTING MACHINE.
APPLICATION FILED FEB. 7, 1906.

2 SHEETS—SHEET 2.

Witnesses
W. M. Stough
Sylvia Boron

Inventor
William W. Irwin
By J. W. Bond
Attorney

UNITED STATES PATENT OFFICE.

WILLIAM W. IRWIN, OF CANTON, OHIO, ASSIGNOR TO THE BERGER MANUFACTURING COMPANY, OF CANTON, OHIO, A CORPORATION OF OHIO.

METAL TRIMMING AND SLITTING MACHINE.

No. 824,694.  Specification of Letters Patent.  Patented June 26, 1906.

Application filed February 7, 1906. Serial No. 299,941.

*To all whom it may concern:*

Be it known that I, WILLIAM W. IRWIN, a citizen of the United States, residing at Canton, in the county of Stark and State of Ohio, have invented certain new and useful Improvements in Metal Trimming and Slitting Machines; and I do hereby declare that the following is a full, clear, and exact description of the same, reference being had to the annexed drawings, making a part of this specification, and to the numerals of reference marked thereon, in which—

Figure 1:
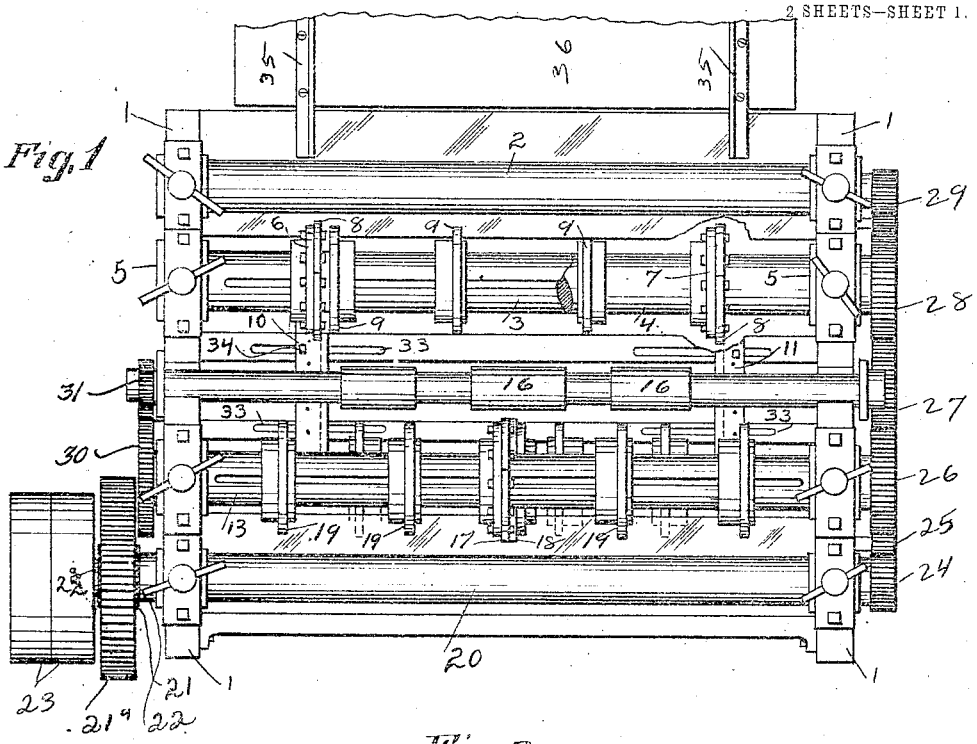
Figure 2:
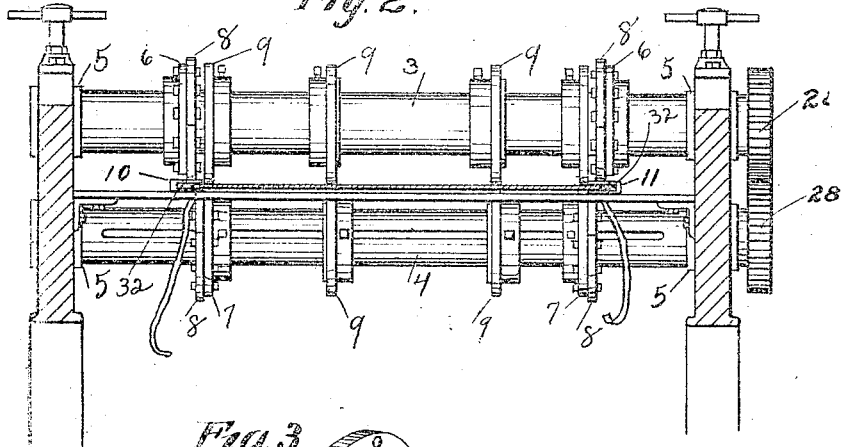
Figure 3:
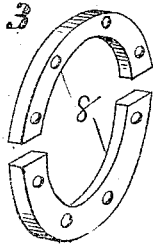
Figure 4:
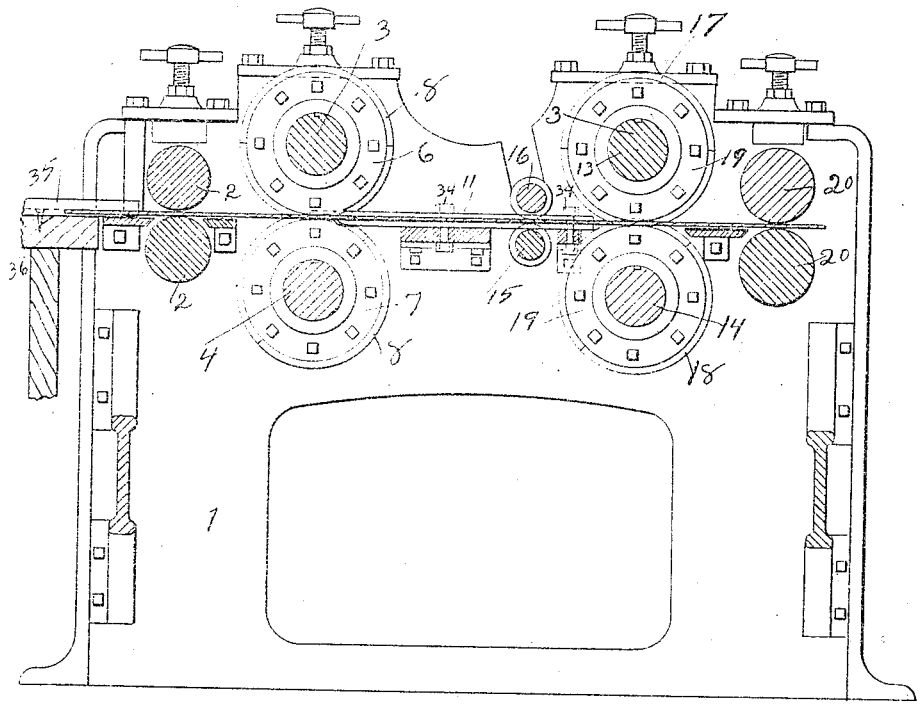
Figure 5:
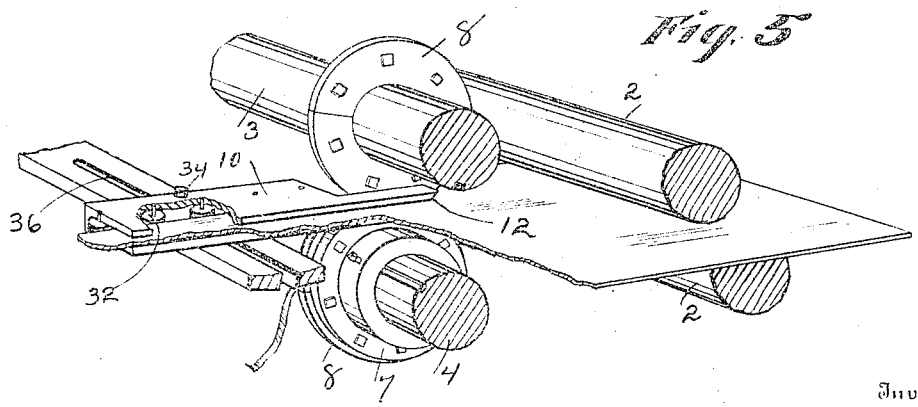

Figure 1 is a top view showing the different parts properly arranged. Fig. 2 is a vertical section showing the rear sides of the trimming-disk-holding shafts and the different parts belonging thereto. Fig. 3 is a detached view of one of the divided trimming or slitting disks. Fig. 4 is a transverse section of the various shafts and illustrating their positions and the positions of the trimming-disks. Fig. 5 is a view showing a portion of the feed-rolls and portions of cutting or trimming disks, showing a portion of one of the gages.

The present invention has relation to trimming and slitting machines whereby a sheet of metal is cut into any desired number of strips, the strips being of uniform width throughout their entire length and the outer edges of the outer strips trimmed—that is to say, the raw edges of the original sheet from which the strips are cut are trimmed so that all the strips and all their edges are properly trimmed.

Similar numerals of reference indicate corresponding parts in all the figures of the drawings.

In the accompanying drawings, 1 represents the frame, which may be of any desired size and of course of sufficient strength to provide the desired amount of rigidity. The feed-rolls 2 are arranged to rotate in opposite directions and to move or feed the sheets or plates of metal designed to be trimmed and cut through the machine proper. The feed-rolls 2 are located directly in front of the shafts 3 and 4, which shafts are journaled at their ends or near their ends in suitable bearings 5. Upon the shafts 3 and 4 are mounted the trimming-disk-connecting collars 6 and 7, to which collars the divided trimming and cutting disks 8 are attached.

For the purpose of providing for trimming sheets or plates of different widths the collars 6 are so mounted and connected upon the shafts 3 and 4 that they can be moved to or from each other longitudinally with reference to said shafts. For the purpose of preventing the sheets from buckling or springing the collars 9 are provided, which collars are so formed that their peripheries will come in contact with the top and bottom faces of the sheet operated upon. The trimming-disks 8 are set upon their respective shafts and secured in a position to trim the raw edges of the sheets. In practice these trimming-disks should be so set that about one-fourth of an inch will be trimmed from each raw edge of the sheet or plate of metal. After the sheets have passed the trimming-disks their edges enter the gages 10 and 11, which gages are so set with reference to the trimming-disks that their seats will be in a direct horizontal plane with the outer trimmed edges of the sheets or plates.

For the purpose of insuring the proper entrance of the sheets in the gages the forward ends of the gages are provided with the bars 12, which bars are located near the trimming-disks.

For the purpose of supporting the sheets and holding the same against buckling or springing between the shafts 3 and 4 and the shafts 13 and 14 the rolls 15 and 16 are provided, which are of course journaled in the frame 1 in any convenient and well-known manner. Upon the shafts 13 and 14 are mounted the slitting-disks 17 and 18, which disks are located out of alinement with the trimming-disks and tandem thereto. In Fig. 1 a single set of slitting-disks are shown, and of course the sheet will be cut into two strips; but any desired number of slitting-disks may be employed and attached to the collars 19 and the collars adjustably attached upon the shafts 13 and 14. The collars 19 also serve the purpose of preventing the sheet from buckling and holding the sheets in proper position to be passed between the delivery-rolls 20, which rolls are located at the rear end of the machine. It will of course be understood that the various shafts are to rotate in proper directions, and in order to bring this result about the gear-wheel 21ª is mounted upon the upper delivery-roll 20, which is driven by the pinion 21, which pinion is mounted upon the power-shaft 22, which power-shaft may be driven by the pulley 23 or in any other convenient and well-known manner. The various gears and pinions 24, 25, 26, 27, 28, and 29 are arranged to so mesh with each other so that the various shafts, except the rolls 15 and 16, will be driven in proper direction and the rolls 15 and 16 driven by the gear-wheels 30 and 31 and the pinion 21. I do not desire, however, to be confined to the particular arrangement of the gearing, as this is more mechanical than otherwise, except that the gearing should be so arranged that all of the upper shafts or rolls will rotate in one direction and all of the lower shafts or rolls will rotate in the opposite direction. For the purpose of reducing the friction as between the edges of the sheets or plates and the gages 10 and 11 said gages may be and preferably are provided with the antifriction-rollers 32, which antifriction-rollers are located substantially as shown in Fig. 5.

For the purpose of providing a means for adjusting the gages 10 and 11 the slots 33 are provided and the gages held in fixed adjustment by means of suitable clamping-bolts 34 or their equivalents.

For the purpose of providing a guide for feeding the various plates or sheets the straight-edge 35 is provided, which straight-edge is connected to the table 36 and should be so located that the trimming-disks 8 will be about one-fourth of an inch nearer the longitudinal center of the machine proper than the straight-edge, by which arrangement the raw or ragged edges of the sheets or plates are trimmed, after which the sheets or plates will move in a straight line through the machine and held against any lateral movement by means of the gages 10 and 11.

It is well understood that it is necessary from time to time to change or remove the cutting and slitting disks, and in order to accomplish this result the trimming-disks and slitting-disks are formed in sections and the sections bolted or otherwise attached to their collars.

Having fully described my invention, what I claim as new, and desire to secure by Letters Patent, is—

1. In a machine of the class described, a frame, a series of shafts provided with trimming and slitting disks, flanges adjustably attached to the shafts, and the trimming and slitting disks formed in sections and connected to the adjustable flanges, substantially as and for the purpose specified.

2. In a machine of the class described, the combination of a frame, a series of shafts journaled in the frame, means for imparting rotary motion to the shafts, cutting-disks formed in sections and connected to adjustable flanges mounted upon the shafts, grooved gages adapted to receive the sheets of metal and provided with antifriction-rollers, substantially as and for the purpose specified.

3. In a machine for trimming and slitting metal sheets, the combination of a frame, a series of shafts journaled in the frame, means for imparting rotary motion to the shafts, trimming-disks mounted upon the shafts, slitting-disks mounted upon shafts tandem to the shafts upon which the trimming-disks are mounted, and grooved gages located between the trimming-disk shafts and the slitting-disk shafts, substantially as and for the purpose specified.

4. In a machine for trimming and slitting metal sheets, the combination of a frame, feed-rollers journaled in the frame, shafts provided with trimming-disks, shafts provided with slitting-disks, grooved gages located between the trimming-disk shafts and the slitting-disk shafts, and the gages provided with bars located adjacent the trimming-disks and the slitting-disks formed in sections and the sections secured to adjustable collars, substantially as and for the purpose specified.

In testimony that I claim the above I have hereunto subscribed my name in the presence of two witnesses.

WILLIAM W. IRWIN.

Witnesses:
F. W. BOND,
SYLVIA BORON.